O. L. OWEN.
BELT SHIPPER.
APPLICATION FILED JULY 27, 1918

1,303,952.

Patented May 20, 1919.
2 SHEETS—SHEET 1.

INVENTOR:
Oscar L. Owen

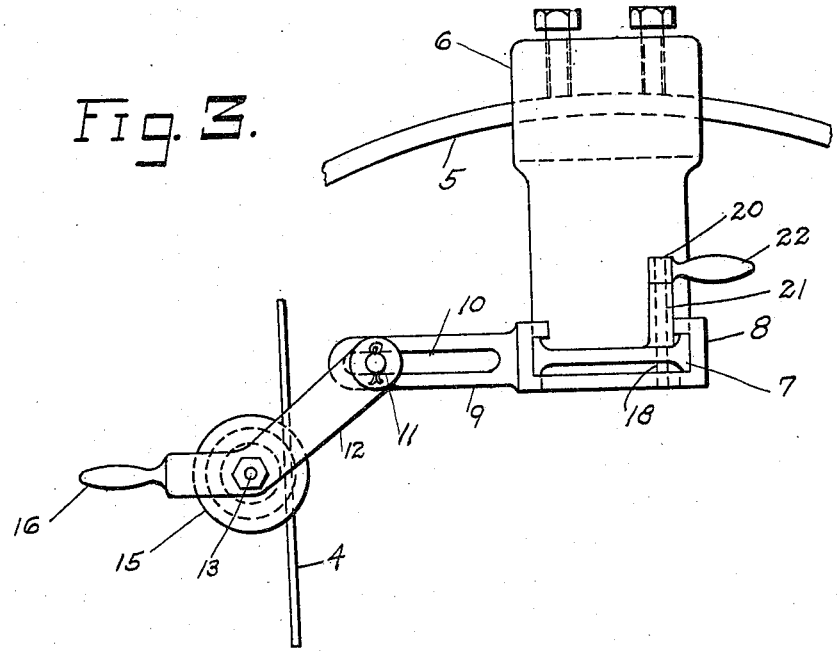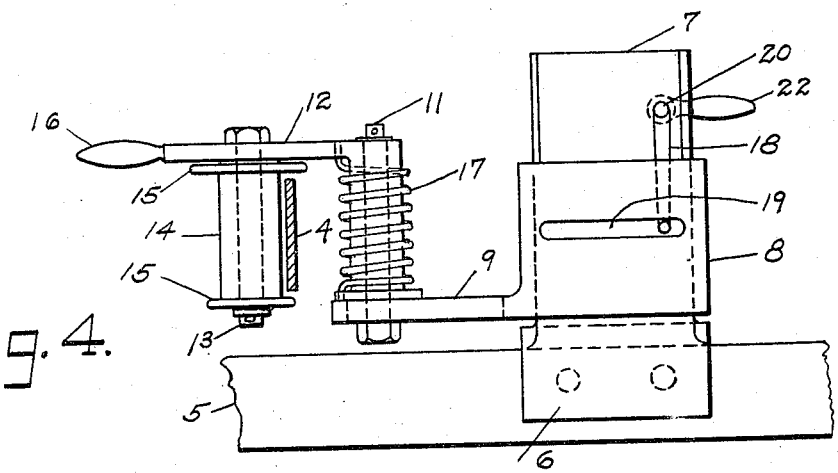

UNITED STATES PATENT OFFICE.

OSCAR L. OWEN, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS.

BELT-SHIPPER.

1,303,952.　　　　Specification of Letters Patent.　　Patented May 20, 1919.

Application filed July 27, 1918. Serial No. 246,979.

*To all whom it may concern:*

Be it known that I, OSCAR L. OWEN, a citizen of the United States, residing at Whitinsville, in the county of Worcester and the Commonwealth of Massachusetts, have invented certain new and useful Improvements in Belt-Shippers, of which the following is a specification.

My invention relates to improvements in belt shipping devices used on machines employing tight and loose pulleys in connection with a belt in the transmission of power. It is especially applicable to machines having an excessive starting torque due to the resistance to rotation of heavy pulleys or cylinders. In machines of this kind the belt very often slips after first being shifted on to the tight pulley consequently the operator customarily aids the starting of the machine by binding the belt into a greater contact with the pulley by pressing his hands against the belt thus rendering himself liable to serious injury. By the use of my improvements all danger of injury to the operator is eliminated.

Figure 2:
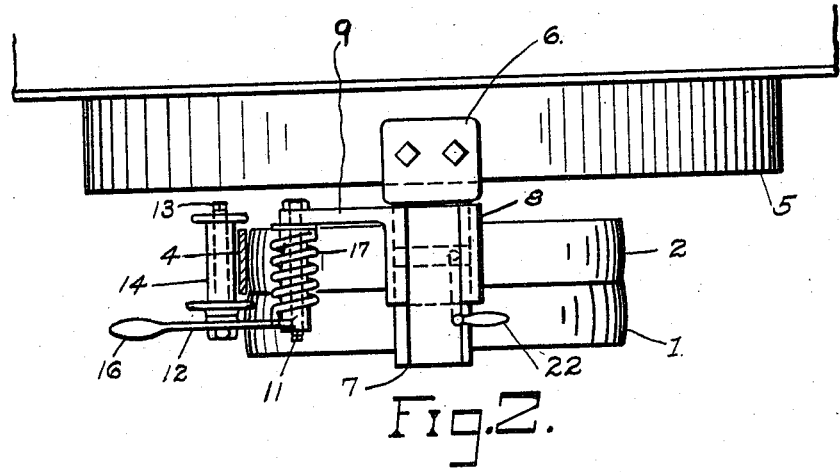
Figure 1:
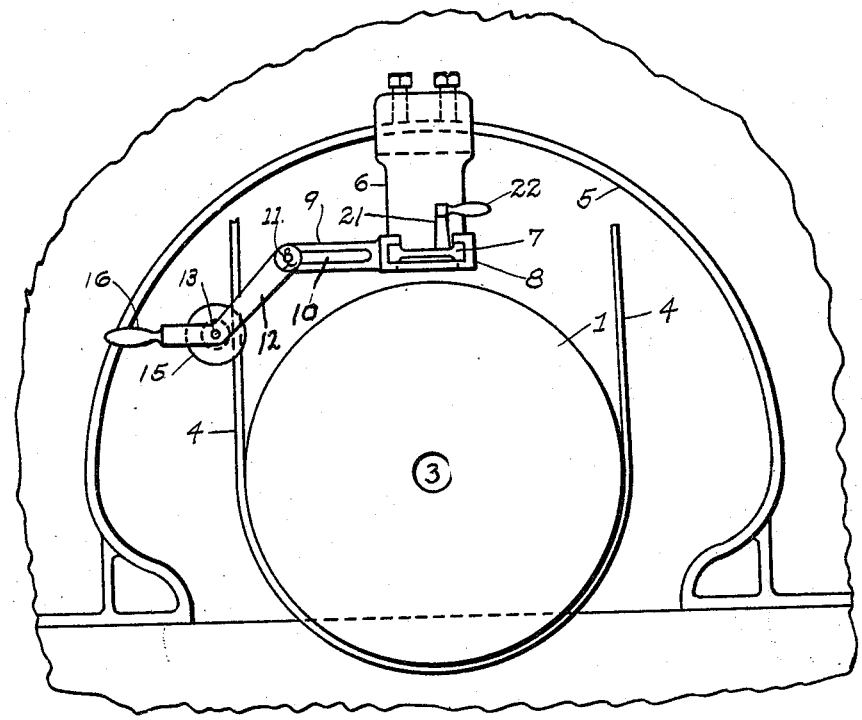

Referring to the accompanying drawings, in which like reference characters designate like parts throughout, Figure 1 is a side elevation of a portion of a carding machine, showing the driving pulley and the attachment of my belt shipper to the frame of the machine, Fig. 2 is a plan view of the same, Fig. 3 is an enlarged view of the belt shipper and Fig. 4 is a bottom view of the same.

In the drawings 1 and 2 are the loose and tight pulleys respectively, mounted on the cylinder shaft 3, 4 is the driving belt, 5 is a fixed portion of the machine on which the bracket 6 of my improved belt shipping device is adjustably mounted. From the lower part of the bracket 6 the way 7 extends horizontally over the pulleys. The shipper slide 8 is supported on the way 7. The slide 8 is provided with an arm 9 containing a slot 10 for the reception of the stud 11. The stud 11 serves as the fulcrum of the manually operated lever 12 on which is mounted a stud 13 acting as a holder for the belt guide pulley 14 with flanges 15 embracing the sides of the belt 4, thus acting as a guide for the belt. The lever 12 is provided with a handle 16 by means of which the operator can impart more or less pressure on the belt through the pulley 14 thereby binding the belt into a greater contact with the driving pulley 2. In normal operation of the machine, the guide pulley 14 is held from contact with the belt by the resistance of the coiled spring 17 acting in conjunction with the hub of the lever 12 and the arm 9 of the shipper slide 8.

To effect the shipping of the belt from one pulley to the other, motion is imparted to the slide 8 by means of a bell crank lever 18 acting in conjunction with the slot 19 in the slide 8 and the spindle 20 held in a fixed bearing 21 in the way 7. A twisting motion is imparted to the spindle 20 by the operator through the handle 22. Other means for imparting motion to the slide may be used without departing from the scope of my invention.

In practice when it is desired to start a machine equipped with my improved belt shipper the operator gives the handle 22 a quarter of a turn thus shipping the belt form the loose to the tight pulley. In case the belt slips the operator facilitates the starting by pressing the guide pulley 14, by means of the lever 12, against the belt so that a larger belt contact is made with the circumference of the driving pulley. After the machine attains full speed the pressure of the belt is released and the pulley returns to a position out of contact with the belt through the action of the spring 17.

I claim:

1. A belt shipper comprising a way, a slide supported on the way, means for imparting motion to the slide, an arm integral with the slide, a lever pivotally connected with the arm, belt guiding means attached to the lever and yielding means for limiting the movement of the lever.

2. In a device of the kind described, in combination with belt and tight and loose pulleys, a bracket adjustably mounted to a fixed part of the machine, a way integral with the bracket, and extending horizontally over the pulleys, a slide supported on the way, an arm integral with the slide, a lever pivotally connected to the arm, a coiled spring forming a yielding connection between the hub of the lever and the slide arm, a stud fixed to the lever, a pulley rotatable on the stud and pulley flanges serving as guides for the belt.

In testimony whereof, I have signed this specification.

OSCAR L. OWEN.

Copies of this patent may be obtained for five cents each, by addressing the "Commissioner of Patents, Washington, D. C."